(12) United States Patent
Feller et al.

(10) Patent No.: US 8,766,206 B2
(45) Date of Patent: Jul. 1, 2014

(54) NEUTRON DETECTION BASED ON ENERGY SPECTRUM CHARACTERISTICS

(75) Inventors: W. Bruce Feller, Tolland, CT (US); Paul L. White, Sturbridge, MA (US)

(73) Assignee: Nova Scientific, Inc., Sturbridge, MA (US)

( * ) Notice: Subject to any disclaimer, the term of this patent is extended or adjusted under 35 U.S.C. 154(b) by 362 days.

(21) Appl. No.: 12/832,615

(22) Filed: Jul. 8, 2010

(65) Prior Publication Data

US 2012/0145913 A1    Jun. 14, 2012

(51) Int. Cl.
*G01T 3/06* (2006.01)
(52) U.S. Cl.
USPC ............................ 250/390.07; 250/390.01
(58) Field of Classification Search
USPC .......................................... 250/390.01, 390.07
See application file for complete search history.

(56) References Cited

U.S. PATENT DOCUMENTS

| 3,146,349 | A  | * | 8/1964  | Jordan ........................ 376/160 |
| 7,439,519 | B2 |   | 10/2008 | Feller et al. ............ 250/390.01 |
| 2002/0139935 | A1 | * | 10/2002 | Klein et al. ............ 250/390.01 |
| 2008/0067394 | A1 | * | 3/2008  | Feller et al. ............ 250/390.01 |
| 2010/0044577 | A1 | * | 2/2010  | Sullivan et al. ......... 250/390.01 |

OTHER PUBLICATIONS

Crow, L. "Chapter 4: Neutron Detectors for Imaging," Neutron Scattering Applications and Techniques, (2009): p. 47-63.*
Tremsin et al. "High efficiency angular selective detection of thermal and cold neutrons," Proc. of SPIE vol. 6945, 69451A, (2008), p. 1-12.*

* cited by examiner

*Primary Examiner* — Casey Bryant
(74) *Attorney, Agent, or Firm* — Fish & Richardson P.C.

(57) ABSTRACT

A neutron detector includes a coincidence detector to detect coincidence events in which each coincidence event indicates proximity in time of a first signal and a second signal. The first signal indicates detection of at least one of a neutron or a gamma ray, and the second signal indicates detection of a gamma ray by a gamma ray detector. A data processor identifies detection of neutron radiation based on characteristics of an energy spectrum of the gamma rays associated with the second signals that correspond to the coincidence signals.

44 Claims, 6 Drawing Sheets

NEUTRON DETECTION BASED ON ENERGY SPECTRUM CHARACTERISTICS

BACKGROUND

This invention relates to neutron detection.

A neutron-sensitive microchannel plate (MCP) can be used to detect special nuclear materials (SNM), such as plutonium, or can be used in neutron imaging. A microchannel plate can be formed by bonding a glass plate between an input electrode and an output electrode, and providing a high voltage direct current (DC) field between the electrodes. The glass plate is perforated with a substantially regular, parallel array of microscopic channels, e.g., cylindrical and hollow channels. Each channel, which can serve as an independent electron multiplier, has an inner wall surface formed of a semi-conductive and electron emissive layer.

A gamma ray, atomic particle, or subatomic particle, e.g., neutron, alpha or beta particle, upon impacting the microchannel plate surface or penetrating into the bulk, will ultimately generate secondary electrons. Regardless of the type and source of the impinging particle, the resulting secondary electrons accelerate along the channel in the DC electric field between the high voltage electrodes. The secondary electrons themselves collide with the channel wall to create a cascade of additional secondary electrons that is registered as an electrical signal at the end of the channel. A microchannel plate detector will register an electrical signal for either a neutron or a gamma ray incident on the detector from the external environment, with a certain level of efficiency depending on the material composition.

SUMMARY

In general, in one aspect, a method includes generating coincidence signals each indicating proximity in time of a first signal and a second signal, the first signal indicating detection of at least one of a neutron or a gamma ray, the second signal indicating detection of a gamma ray; and generating a detection signal indicating detection of neutron radiation based on characteristics of an energy spectrum of the gamma rays associated with the second signals that correspond to the coincidence signals.

Implementations may include one or more of the following features. Generating a detection signal can include generating a detection signal indicating detection of neutron radiation upon detecting a feature in the energy spectrum of the gamma rays associated with the second signals, the feature occurring within a characteristic energy range. The feature in the energy spectrum can include a peak. The characteristic energy range can correspond to a range from, for example, 470 keV to 490 keV, or from 190 keV to 210 keV, or from 170 keV to 190 keV. Each coincidence signal indicates that a second signal occurs within a specified time period after occurrence of the first signal. Generating a detection signal can include generating a detection signal indicating detection of neutron radiation upon detecting a first feature and a second feature in the energy spectrum of the gamma rays that correspond to the coincidence signals, the first feature occurring within a first characteristic energy range and the second feature occurring within a second characteristic energy range. Each of the first and second features in the energy spectrum can include a peak. The first characteristic energy range can correspond to a range from 470 keV to 490 keV and the second characteristic energy range can correspond to a range from 170 keV to 210 keV. The method can include generating the first signal using a microchannel plate detector. The method can include generating the first signal using a plurality of interconnected fibers having electron-emissive surfaces. Generating the first signal can include capturing neutrons using multiple nuclide species and generating gamma rays upon the capture of neutrons. The multiple nuclide species can include boron-10 atoms and at least one of gadolinium-155 atoms or gadolinium-157 atoms. The method can include generating a gamma ray energy spectrum using the second signals that correspond to coincidence signals.

In general, in another aspect, a method includes generating first signals using a microchannel plate detector, each of the first signals indicating detection of at least one of a neutron or a gamma ray; generating second signals using a gamma ray detector, each of the second signals indicating detection of a gamma ray; generating coincidence signals each corresponding to a determination that one of the second signals occurs within a predetermined time period of occurrence of one of the first signals; and generating a detection signal indicating detection of neutron radiation if the second signals that correspond to the coincidence signals indicate a first peak in an energy spectrum of the gamma rays associated with the second signals, the first peak occurring within a first characteristic energy range.

Implementations may include one or more of the following features. Generating the first signals can include using a microchannel plate detector that is doped or coated with multiple nuclide species that emit gamma rays when capturing neutrons. The nuclide species can include boron-10 and at least one of gadolinium-155 or gadolinium-157. The first characteristic range corresponds to a range from 470 keV to 490 keV, a range from 190 keV to 210 keV, or a range from 170 keV to 190 keV. Generating a detection signal can include generating a detection signal if the second signals corresponding to the coincidence signals indicate a first peak and a second peak in an energy spectrum of the gamma rays associated with the second signals, the first peak occurring within a first characteristic energy range and the second peak occurring within a second characteristic energy range. The first characteristic energy range can correspond to a range from 470 keV to 490 keV and the second characteristic energy range can correspond to a range from 170 keV to 210 keV. In some examples, each of the coincidence signals can indicate that the corresponding second signal occurs within 50 nanoseconds after occurrence of the corresponding first signal. In some examples, each of the coincidence signals can indicate that the corresponding second signal occurs within 10 nanoseconds after occurrence of the corresponding first signal.

In general, in another aspect, a method includes generating first signals using a plurality of interconnected fibers having electron-emissive surfaces, each of the first signals indicating detection of at least one of a neutron or a gamma ray; generating second signals using a gamma ray detector, each of the second signals indicating detection of a gamma ray; generating coincidence signals each corresponding to a determination that one of the second signals occurs within a predetermined time period of occurrence of one of the first signals; and generating a detection signal indicating detection of neutron radiation if the second signals corresponding to the coincidence signals indicate a first peak in an energy spectrum of the gamma rays associated with the second signals, the first peak occurring within a first characteristic energy range.

Implementations may include one or more of the following features. The plurality of interconnected fibers are doped or coated with at least one of boron-10 or gadolinium.

In general, in another aspect, a method includes generating first signals using a microchannel plate detector, each of the first signals indicating detection of at least one of a neutron or a gamma ray, the microchannel plate detector includes material doped or coated with multiple nuclide species that include at least two nuclide species that emit gamma rays having different energy levels upon capture of neutrons; generating second signals using a gamma ray detector, each of the second signals indicating detection of a gamma ray; generating coincidence signals each indicating proximity in time of one of the first signals and one of the second signals; and generating an energy spectrum of the gamma rays associated with the second signals that correspond to the coincidence signals.

Implementations may include one or more of the following features. The material can include at least one of glass, silicon, hydrogenous materials (e.g., plastics), or ceramics. The method can include detecting two peaks in the energy spectrum, the first peak being within a first predetermined characteristic energy range, the second peak being within a second predetermined characteristic energy range. The method can include generating a detection signal indicating detection of a stream of neutrons upon detection of the two peaks. The first characteristic energy range corresponds to a range from 470 keV to 490 keV and the second characteristic energy range corresponds to a range from 170 keV to 210 keV.

In general, in another aspect, an apparatus includes a coincidence detector to detect coincidence events in which each coincidence event indicates proximity in time of a first signal and a second signal, the first signal indicating detection of at least one of a neutron or a gamma ray, the second signal indicating detection of a gamma ray by a gamma ray detector; and a data processor to identify detection of neutron radiation based on characteristics of an energy spectrum of the gamma rays associated with the second signals that correspond to the coincidence signals.

Implementations may include one or more of the following features. The coincidence detector can include a time-to-digital converter to analyze timing of the first and second detection signals. The data processor can identify detection of neutron radiation by detecting a first peak in the energy spectrum of the gamma rays associated with the second signals that correspond to the coincidence events, the first peak occurring within a first characteristic energy range. The apparatus can also include a microchannel plate detector that generates the first signal upon detection of at least one of a neutron or a gamma ray. The microchannel plate detector can include a material doped or coated with multiple nuclide species that, upon capture of a neutron, emit a gamma ray directly or generate a second particle in an excited state that subsequently decays to a lower energy state and emits a gamma ray. The multiple nuclide species can include boron-10 and at least one of gadolinium-155 or gadolinium-157. The material can include glass, silicon, hydrogenous materials (e.g., plastics), or ceramics. The apparatus of claim 31, further includes a plurality of interconnected fibers having electron-emissive surfaces that generates the first signal upon detection of at least one of a neutron or a gamma ray. The plurality of interconnected fibers are doped or coated with boron-10 or gadolinium.

In general, in another aspect, an apparatus includes a microchannel plate detector to generate a first detection signal upon detection of at least one of a neutron or a gamma ray; a gamma ray detector to generate a second detection signal upon detection of a gamma ray; and a data processor to detect coincidence events each indicating proximity in time of the first detection signal and the second detection signal, and to detect neutron radiation based on characteristics of an energy spectrum of the gamma rays associated with the second signals corresponding to the coincidence events.

Implementations may include one or more of the following features. The microchannel plate detector can include a material doped or coated with multiple nuclide species that, upon capture of a neutron, emit a gamma ray directly or generate a second particle in an excited state that subsequently decays to a lower energy state and emits a gamma ray. The multiple nuclide species can include boron-10 and at least one of gadolinium-155 or gadolinium-157. The material can include at least one of glass, silicon, plastics, or ceramics. The apparatus can include a time-to-digital converter to analyze timing of the first and second detection signals.

In general, in another aspect, an apparatus includes a plurality of interconnected fibers having electron-emissive surfaces that generate the first signal upon detection of at least one of a neutron or a gamma ray; a gamma ray detector to generate a second detection signal upon detection of a gamma ray; and a data processor to detect coincidence events each indicating proximity in time of the first detection signal and the second detection signal, and to detect neutron radiation based on characteristics of an energy spectrum of the gamma rays associated with the second signals that correspond to the coincidence events.

Implementations may include one or more of the following features. The plurality of interconnected fibers can include a material doped or coated with boron-10 or gadolinium. The material can include at least one of glass, silicon, hydrogenous materials (e.g., plastics), or ceramics. The apparatus can include a time-to-digital converter to analyze timing of the first and second detection signals.

DETAILED DESCRIPTION

Figure 1:
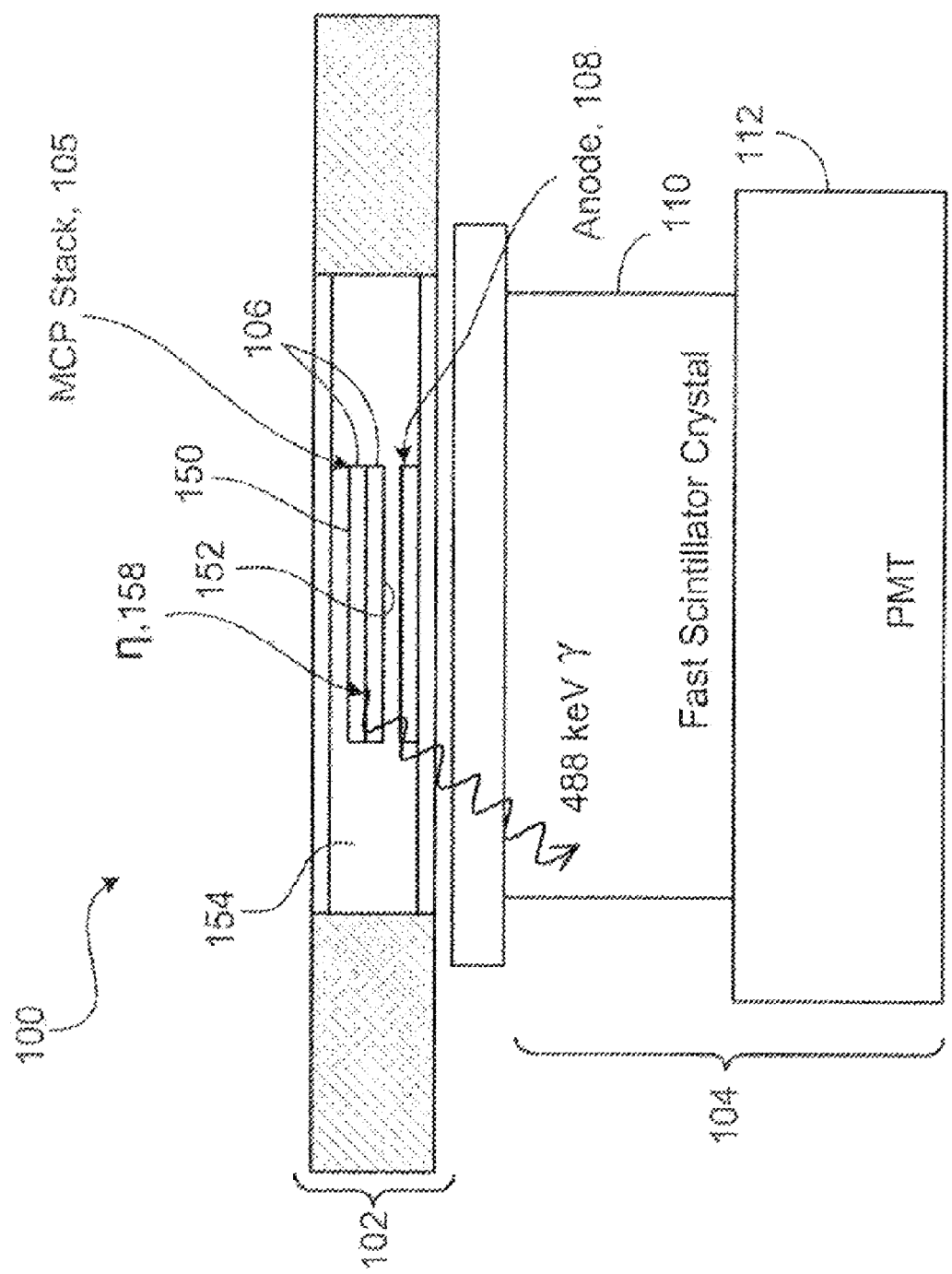
FIG. 1 is a schematic diagram of a neutron detector with integral microchannel plate detector and gamma ray detector.

FIG. 1 is a schematic diagram of an exemplary neutron detector 100 that includes a microchannel plate detector 102 and a gamma ray detector 104. The microchannel plate detector 102 includes a microchannel plate stack 105 having one or more microchannel plates 106 stacked together. The microchannel plate stack 105 has a top electrode 150 connected to a more negative voltage and a bottom electrode 152 connected to a more positive voltage. An anode 108 is provided to collect electron emissions from the microchannel plate stack 105. The microchannel plate stack 105 and the anode 108 are housed within a vacuum chamber 154. The microchannel plates 106 are sensitive to both neutrons and gamma rays. An output signal from the anode 108 may indicate detection of a neutron or a gamma ray.

The microchannel plate detector 102 generates an output signal for both incident neutrons and incident gamma rays, with a certain level of efficiency depending on the material composition. In some implementations, the microchannel plates 106 are doped with a nuclide species capable of absorbing a neutron and generating a gamma ray as a product, and the resulting gamma ray can be used to indicate that a neutron, not a gamma ray, impinged on the microchannel plate detector 102. A gamma ray generated by neutron capture in the microchannel plates 106 can be detected by the gamma ray detector 104. The microchannel plates 106 can be made of various materials. The following describes glass microchannel plates as examples, but the microchannel plates can also be made of hydrogenous materials (e.g., plastics), ceramics, silicon, or other materials.

In some implementations, instead of doping the microchannel plate bulk material with neutron-absorbing material, the microchannel plate can be coated with a thin layer of neutron-absorbing material, as described in U.S. Provisional Patent Application No. 61/316,710, filed on Mar. 23, 2010 (incorporated herein by reference in its entirety), above which a thin layer of semiconducting material 106 and a thin layer of electron emissive material 108 are formed. The thin layers can be formed on the surfaces of the microchannels 110 using, for example, atomic layer deposition. In some implementations, the microchannel plate is doped with neutron-capturing material and also coated with a thin layer of neutron-capturing material to enhance the neutron capturing capability. The doped neutron-capturing material can be the same or different from the coated neutron-capturing material.

As will be described in more detail below, detecting a signal from the gamma ray detector 104 coincident with (e.g., within 10 ns) detecting a signal from the microchannel plate detector 102 indicates a high probability that a neutron absorption event in the microchannel plates 106 was responsible for both signals. As a result, coincident signals from the gamma ray detector 104 and the microchannel plate detector 102 can be used to reduce false detections of neutrons due to random, background gamma rays. The coincident gamma ray detector and microchannel plate detector signals can also be processed to detect features in an energy spectrum of accumulated gamma rays. As will be described in more detail below, using features in the gamma ray energy spectrum to indicate the presence of a neutron flux can further reduce false detections of neutrons.

The microchannel plates 106 include glass that forms the walls that define the channels. The glass is doped (or coated) with one or more nuclide species capable of capturing neutrons and emitting atomic or subatomic particles as products of neutron capture. An emitted particle traverses an adjacent channel, where it causes secondary electrons to enter the channel. The bottom electrode 152 of the microchannel plate stack 105 has a more positive DC bias voltage than the top electrode 150 of the microchannel plate stack 105. The DC bias voltage generates an electric field (e.g., about 1 kV/mm) that accelerates electrons in the channel toward the bottom electrode 152. As the electrons bounce against the channel walls, more electrons are released. The signal at the anode 108 is read out and sent to a signal processor, such as a multichannel time-to-digital converter 136 (see FIG. 2), for comparison with an output signal from the gamma ray detector 104.

For example, the microchannel plates 106 can be model B14e, available from Nova Scientific, Inc., Sturbridge, Mass. To make the microchannel plates 106 sensitive to neutrons, they can be made of glass (or other materials such as hydrogenous materials (e.g., plastics), silicon, or ceramics) doped (or coated) with a nuclide species capable of capturing neutrons and emitting gamma rays in the process, e.g., a boron-10 or gadolinium doped silicate glass having 5 mol % or more of boron-10 oxide, or 2 mol % or more of gadolinium oxide. If the microchannel plates 106 are doped (or coated) with boron-10 particles, then neutron capture in a boron-10 atom generates both a lithium-7 and an alpha particle. With 94% probability, the lithium-7 particle created by neutron capture is in an excited state, which then converts to a lower energy state by emitting a 478 keV gamma ray. The resulting gamma ray can be detected by the gamma ray detector 104, which is sensitive only to gamma rays (not neutrons).

For example, the gamma ray detector 104 can include a fast scintillator crystal 110 and a photomultiplier tube (PMT) 112. The scintillator crystal 110 emits scintillation light upon receiving a gamma ray, and the photomultiplier tube 112 captures and amplifies the scintillation light. The output of the photomultiplier tube 112 is amplified by an amplifier 114. For example, the scintillator crystal 110 can be an NaI scintillator crystal, made by St. Gobain or Alpha Spectra. The photomultiplier tube 112 can be model H8500C, available from Hamamatsu.

The microchannel plate detector 102 can also detect gamma rays with relatively low efficiency but which can cause cascades of electrons in the channels. Thus, when the microchannel plate detector 102 generates a detection signal, the detection signal can indicate either detection of a neutron or detection of a gamma ray. In order to determine whether the microchannel plate detector 102 has detected a neutron or a gamma ray, the scintillator crystal 110 is used to detect the gamma ray that is generated as a result of the neutron capture reaction in the doped (or coated) glass of the microchannel plates 106. If the gamma ray travels towards the scintillator crystal 110, the gamma ray can be detected by the gamma ray detector 104. By measuring a time proximity of a signal from the microchannel plate detector 102 and a signal from the gamma ray detector 104, one can determine whether a neutron or a gamma ray was detected by the microchannel plate detector 102.

Of the gamma rays that are emitted isotropically due to neutron capture in the microchannel plates 106, only a fraction can be detected by the scintillator crystal 110 that is placed only on the bottom side of the microchannel plate detector 102. This is due to the low or fractional solid angle of the scintillator. Using two larger scintillator crystals, one above and one below the microchannel plate detector 102, can increase the detection rate of the gamma rays, due to larger solid angle capture.

Any of several nuclide species with high neutron capture cross sections, including boron-10, gadolinium-155, and gadolinium-157, may be used to efficiently capture neutrons. Such species can be used as dopants or coatings of the glass used in the microchannel plates 106. When a boron-10 particle captures a neutron 158, the boron-10 decays into an alpha particle ($^4$He) and a lithium-7 particle, as in the reaction below:

$$n+^{10}B \rightarrow {}^7Li+{}^4He+Q \text{ (2.79 MeV)},$$

where n represents a neutron, Q is the energy released in the reaction. There is about 94% probability that the lithium-7 ion will initially be in an excited state, whereupon the lithium-7 ion decays to a lower energy state and emits a 478 keV gamma ray.

Gadolinium (Gd) captures neutrons in the following reactions:

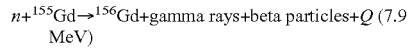

$$n+^{155}Gd \rightarrow {}^{156}Gd + \text{gamma rays} + \text{beta particles} + Q \text{ (7.9 MeV)}$$

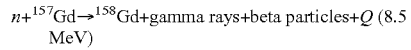

$$n+^{157}Gd \rightarrow {}^{158}Gd + \text{gamma rays} + \text{beta particles} + Q \text{ (8.5 MeV)}$$

where Q is the total energy released by gamma ray emission in each reaction. Each reaction releases a cascade of gamma rays with an energy spectrum peaked at 182 keV ($^{157}$Gd isotope) or 199 keV ($^{155}$Gd isotope) that is detectable by the gamma ray detector 104.

When a neutron 158 is captured by a dopant atom in the microchannel plates 106, the particles emitted during the capture reaction can be detected by the microchannel plate detector 102. The capture reaction also emits gamma rays that can be detected by the gamma ray detector 104 within a very short period of time, e.g., within less than 10 ns, after the capture reaction was detected by the microchannel plate detector 102. Thus, by detecting coincidence events in which a signal from the gamma ray detector 104 occurs within a timing coincidence window, e.g., about 10 ns, of the occurrence of a signal from the microchannel plate detector 102, a valid neutron event (i.e., an event in which a neutron, and not a gamma ray, is incident on the microchannel plates 106) can be identified with high confidence. The timing coincidence window of about 10 ns is short enough to exclude most background gamma rays even at a gamma flux in the range of a million counts per second.

The microchannel plate detector 102 using typical materials, will have a small (~0.1 to 1%) detection efficiency for gamma rays, reducing the frequency with which it detects background gamma rays not associated with neutron capture. Even if the microchannel plate detector 102 does generate a false neutron detection signal due to a background gamma ray, the probability is low that another background gamma ray will arrive at the gamma ray detector 104 within a 10 ns coincidence window of the false detection by the microchannel plate detector 102. For this reason the rate of false neutron detections among the coincidence events is much lower, perhaps orders of magnitude lower, than the rate of false neutron detections by the microchannel plate detector 102.

Some coincidence events will nevertheless represent false neutron detections because of the finite probability that two gamma rays will arrive at the neutron detector 100 within the span of the timing coincidence window. A coincidence event may also occur due to, for example, Compton scattering of a gamma ray, where the incident gamma ray scatters off an electron in the microchannel plate material, and ejects it into a microchannel to create a detectable pulse. The energy-downshifted scattered gamma ray may then be detected by the scintillator, within the coincidence timing window. If the gamma ray is detected by the microchannel plate detector 102 (from the recoil electron entering the microchannel and creating an MCP output pulse), then the same energy-downshifted gamma ray is detected by the gamma ray detector 104, the pair of detections will result in a false neutron detection. The likelihood of such false detections will increase with the background gamma ray flux incident on the neutron detector 100 from the environment.

Figure 2:
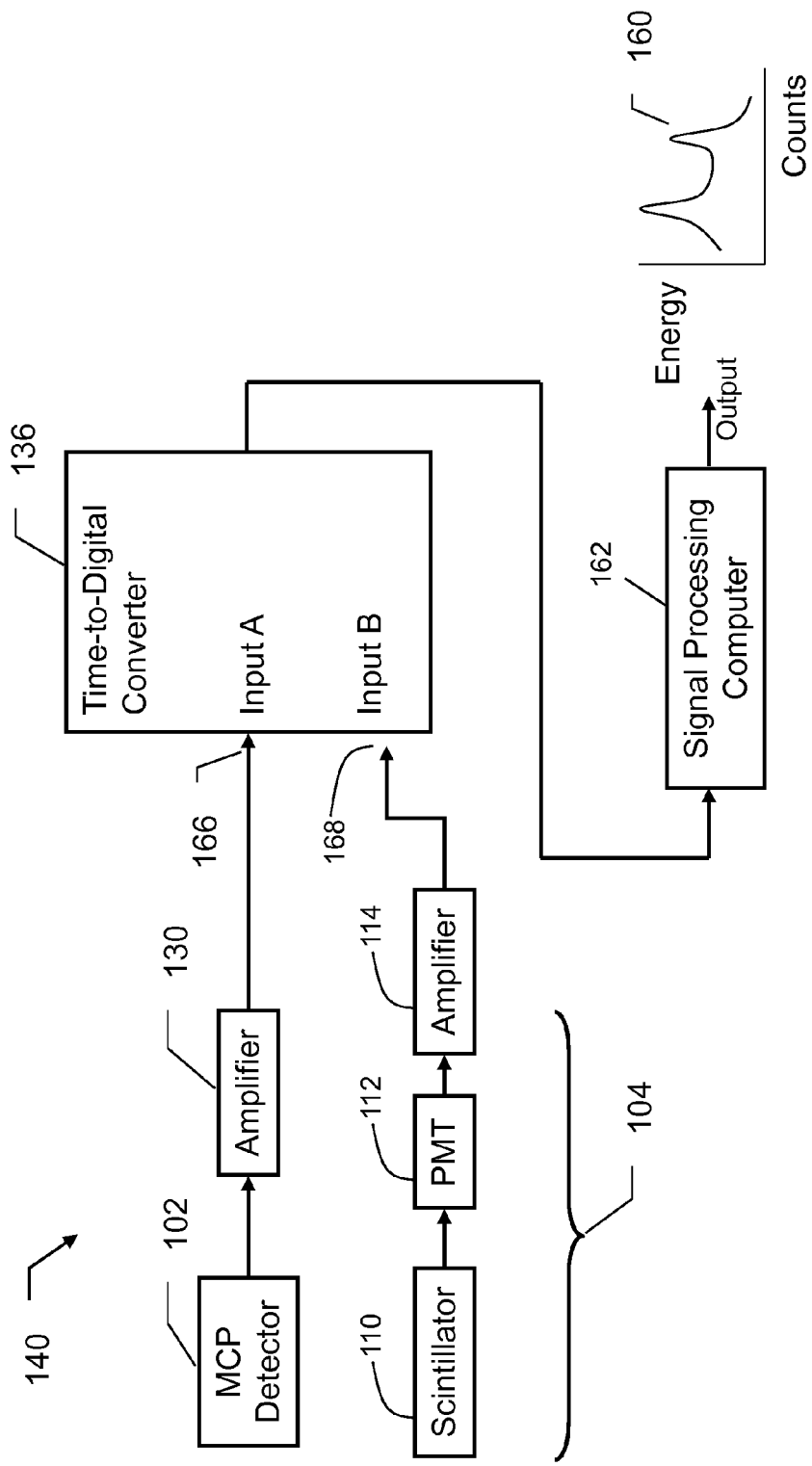
FIG. 2 is a block diagram of a neutron detection system.

FIG. 2 is a block diagram of an example neutron detection system 140 that can detect neutrons emitted from an object. In some examples, the neutron detection system 140 can also determine the neutron flux, i.e., a number of neutrons per second, emitted from the object. The neutron detection system 140 includes a microchannel plate detector 102, a scintillator 110, and a photomultiplier tube 112, similar to those shown in FIG. 1. The system 140 reduces the chance of falsely detecting neutrons by analyzing the energy spectrum of the gamma rays detected by the scintillator 110 that correspond to coincidence events. If the gamma ray energy spectrum shows features characteristic of gamma rays emitted during neutron capture by dopants or coatings of the microchannel plates 106, there is a greater likelihood that the gamma rays correspond to neutrons incident on the neutron detector 100. For example, the energy spectrum of gamma rays emitted during neutron capture by boron-10 has characteristic features including elevated counts in a range from 470 keV to 490 keV and a peak at about 478 keV. Neutron capture by gadolinium also produces a characteristic energy spectrum with elevated counts in the ranges from 170 keV to 190 keV and 190 keV to 210 keV and peaks at about 182 keV and 199 keV, respectively.

The energy of gamma rays detected by the scintillator crystal 110 of the gamma ray detector 104 can be measured by the intensity of the corresponding scintillation flashes, which are proportional to the energy of the detected gamma rays. The photomultiplier tube 112 transforms each flash into an electrical signal with an amplitude that is likewise proportional to the gamma ray energy. After the gamma ray detector 104 is calibrated with a test source of gamma rays of known energy, the amplitude of the output pulses of the photomultiplier tube 112 can be used to determine the energy of incident gamma rays.

The decay time of the signal from the scintillator crystal 110, which can be less than 100 ns, is much shorter than the average arrival interval of background gamma rays, even at a high background rate of 1.0E+06 gamma rays per second. As a result, the probability is low that output pulses of the scintillator crystal 110 will overlap. The output signal of the photomultiplier tube 112 therefore comprises a series of pulses, one pulse corresponding to each gamma ray detected.

The photomultiplier tube 112 output pulses are classified according to amplitude. This enables one to determine the energy spectrum of a stream of gamma rays detected by the scintillator crystal 110. The neutron detection system 140 computes the gamma ray energy spectrum using only the output signals of the photomultiplier tube 112 that correspond to coincident detections in the microchannel plate detector 102, so the energy spectrum is constructed from data points that exclude the contribution of most background gamma rays. This is beneficial because background gamma rays constitute a source of noise that can obscure features in the gamma ray energy spectrum. For example, features 170 and 172 (peaks in the energy spectrum, see FIG. 3) are observed when background gamma rays are excluded from the energy spectrum, but are nearly overwhelmed when the background gamma rays are present, leaving only the barely noticeable feature 176 (see FIG. 4).

When the contribution of the background gamma rays is excluded, features in the shape of the gamma ray energy spectrum can be used to identify the nuclear processes that generated the observed gamma rays. For example, the features in the energy spectrum can be peaks at particular energies indicating that the observed gamma rays resulted from neutron capture by boron-10 or gadolinium dopants (or coatings) of the microchannel plates 106. The presence of peaks at particular energy levels in the energy spectrum identifies the source of gamma rays as neutron capture in the microchannel plates 106.

The output signals of the microchannel plate detector 102 (i.e., signals received at the anode 108 of the microchannel plate detector 102) are amplified by an amplifier 130. The output of the amplifier 130 is sent to an Input A 166 at the time-to-digital converter (TDC) 136. The output of the photomultiplier tube amplifier 114 is sent to an Input B 168 at the time-to-digital converter 136. The time-to-digital converter 136 may include timing modules to condition the signals from the microchannel plate detector 102 and photomultiplier tube 112, taking into consideration the different signal paths traveled by the signals from the microchannel plate detector 102 and photomultiplier tube 112 to the time-to-digital converter 136.

The time-to-digital converter 136 associates an arrival time with each of the pulses on Input A 166 and Input B 168. The time-to-digital converter 136 measures the amplitude of the photomultiplier tube 112 pulses. The time-to-digital converter 136 sends a digital representation of the pulse arrival times and pulse amplitudes to the signal processing computer 162. An example of a time-to-digital converter that integrates these functions with associated software is a dual start-stop time-to-digital converter, model DSDTC-II, available from Sensor Sciences, LLC, Pleasant Hill, Calif.

The signal processing computer 162 can be, for example, a personal computer running software to process the data provided by the time-to-digital converter 136. The computer 162 determines a time difference between a signal received from the timing module 132 and a signal received from at Input A 166 and Input B 168, and compares the time difference to a preset timing coincidence window. If the time difference is less than the timing coincidence window (e.g., 10 or 50 ns), the signal processing computer 162 generates a coincidence signal internally. The signal processing computer 162 counts the number of photomultiplier tube 112 pulses per unit of time as a function of pulse height for pulses that correspond to coincidence signals, and generates a histogram that represents an energy spectrum 160 of the stream of gamma rays corresponding to coincidence events.

The neutron detection system 140 reduces the chance of falsely indicating neutron radiation by analyzing the energy spectrum 160 of the gamma rays that correspond to coincidence events. By comparing the energy spectrum 160 to the characteristic energy spectra of gamma rays emitted when neutrons are captured by dopants of the microchannel plates 106, the signal processing computer 162 determines whether neutron radiation is present. Neutron capture by each dopant or coating species in the microchannel plate 102 produces gamma rays with its own characteristic energy spectrum. For example, as will be discussed in greater detail below, a gamma ray energy spectrum 174 (see FIG. 3) reveals one characteristic peak 170 due to neutron capture by gadolinium and another peak 172 due to capture by boron-10.

If the characteristic features of neutron capture in the microchannel plates 106, e.g., either or both of peaks 170 and 172 (see FIG. 3), are detected in the energy spectrum 160, the signal processing computer 162 provides an indication that neutron radiation has been detected. This indicates that the object being tested is emitting neutrons. Coincidence events that are not associated with neutron capture may result from, e.g., random background gamma rays or Compton-scattered gamma rays. It is unlikely that such gamma rays have an energy spectrum with peaks at about 478 keV, 182 keV, or 199 keV. Therefore, the signal processor 162 can detect the presence of neutron radiation with few false detections.

An advantage of the neutron detection system 140 is that by detecting features in the gamma ray energy spectrum obtained using signals from the scintillator 110 that are coincident with signals from the microchannel plate detector 102, false positive detection of neutrons can be reduced. Using the coincidence events to reduce the contribution by background gamma rays to the energy spectrum 160 has an advantage of increasing the sensitivity of the neutron detection system 140. Increased sensitivity results because the system 140 can accumulate gamma ray pulses for longer observation periods without simultaneously accumulating background gamma rays that would eventually overwhelm the energy spectrum 160.

Figure 3:
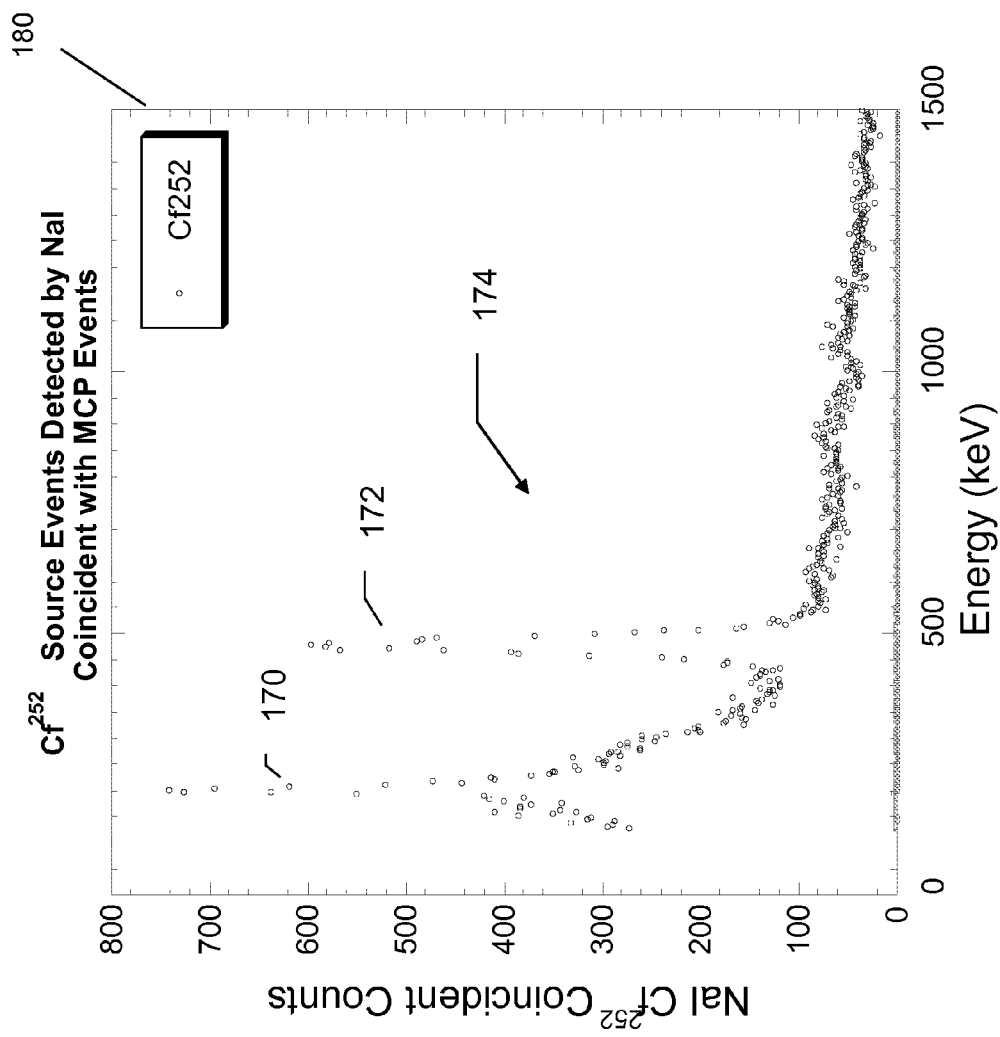
FIG. 3 is a graph of an energy spectrum of gamma rays emitted by neutron capture in a microchannel plate detector, with data obtained based on coincidence events.

FIG. 3 is a graph 180 of an example gamma ray energy spectrum 174 in which the data points were obtained by experiment. The energy spectrum 174 corresponds to the pulse height distribution of gamma ray detector 104 signals that are coincident with microchannel plate detector 102 signals. Coincidence detection processing by the signal processing computer 162 substantially reduces the contribution of background gamma rays to the energy spectrum 174. Peaks 170 and 172 are prominent and can be detected by the signal processing computer 162 using pattern recognition software, or a peak search algorithm.

To obtain the energy spectrum 174, the microchannel plates 106 were doped (or coated) with boron-10, gadolinium-155, and gadolinium-157. The microchannel plates 106 were irradiated with both gamma rays and thermal neutrons from a californium-252 test source. Peak 170 in energy spectrum 174 corresponds to 199 keV gamma rays emitted when neutrons are captured by the gadolinium dopant. Peak 172 corresponds to neutron capture by boron-10, generating 478 keV gamma rays.

If the gamma ray energy spectrum does not show peaks at about 478 keV or 199 keV, there is a low likelihood that the gamma rays were generated as a result of neutron capture by the boron-10 or gadolinium dopants. Therefore, such an energy spectrum indicates a low probability that a stream of neutrons has been detected.

Figure 4:
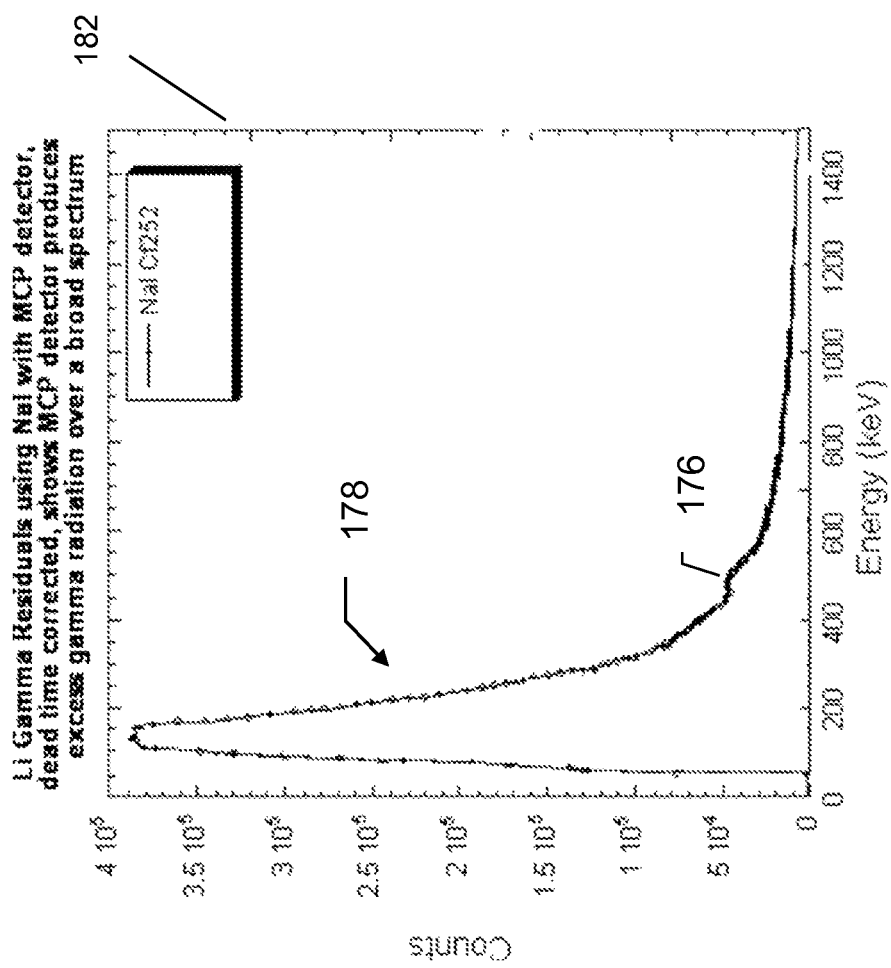
FIG. 4 is a graph of an energy spectrum of gamma rays emitted by neutron capture in a microchannel plate detector.

FIG. 4 is a graph 182 of an example gamma ray energy spectrum obtained by the neutron detector 100, but without coincidence processing to eliminate the contribution of an external gamma ray field. The microchannel plates 106 were irradiated with both gamma rays and thermal neutrons emitted from fission events in a californium-252 test source. Now the background gamma rays obscure the gadolinium peak and reduce the boron-10 peak due to neutron interactions with boron-10 atoms in the MCP, to a small bump 176 on the energy spectrum 178. The rapid increase in counts towards the low energy range of the plot is due to enhanced absorption of gamma rays in NaI(T1) at lower energies.

Figure 5:
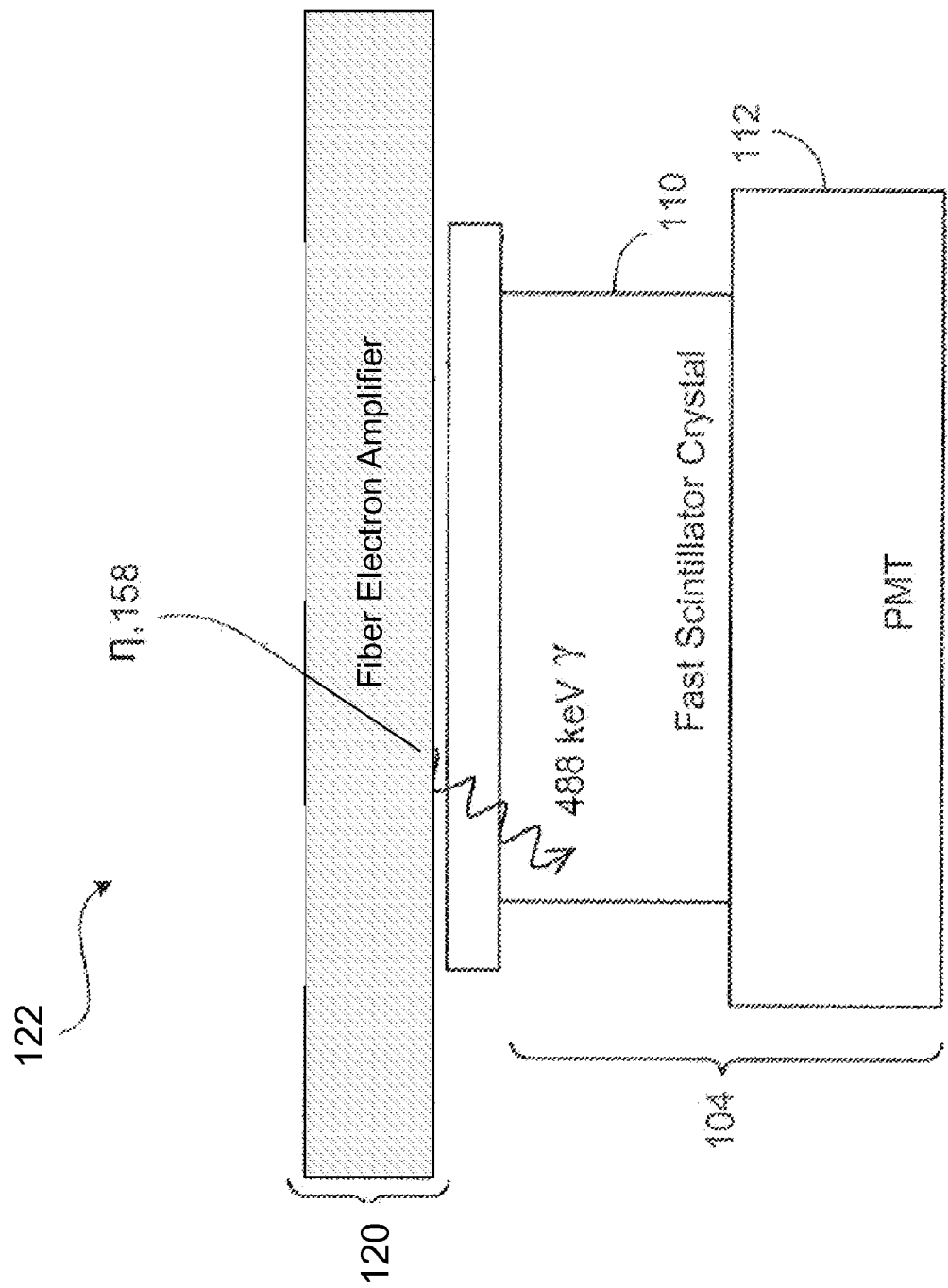
FIG. 5 is a schematic diagram of a neutron detector with integral fiber electron amplifier and gamma ray detector.

FIG. 5 is a schematic diagram of an example neutron detector 122 that includes a microfiber neutron detector/electron amplifier 120 and a gamma ray detector 104. For example, the detector/amplifier 120 may include microfibers made of glass, hydrogenous materials (e.g., plastics), or ceramics. The output signal of the microfiber detector/amplifier 120 may indicate detection of a neutron or a gamma ray but does not provide information on which of a neutron or a gamma ray is detected. The outputs of the microfiber neutron detector/electron amplifier 120 and the gamma ray detector 104 can be processed by the time-to-digital converter 136 and the signal processing computer 162 of FIG. 2 to generate a histogram that represents an energy spectrum 160 of the stream of gamma rays corresponding to coincidence events. The energy spectrum 160 is analyzed to determine whether a neutron flux has been detected using the method described above.

Figure 6:
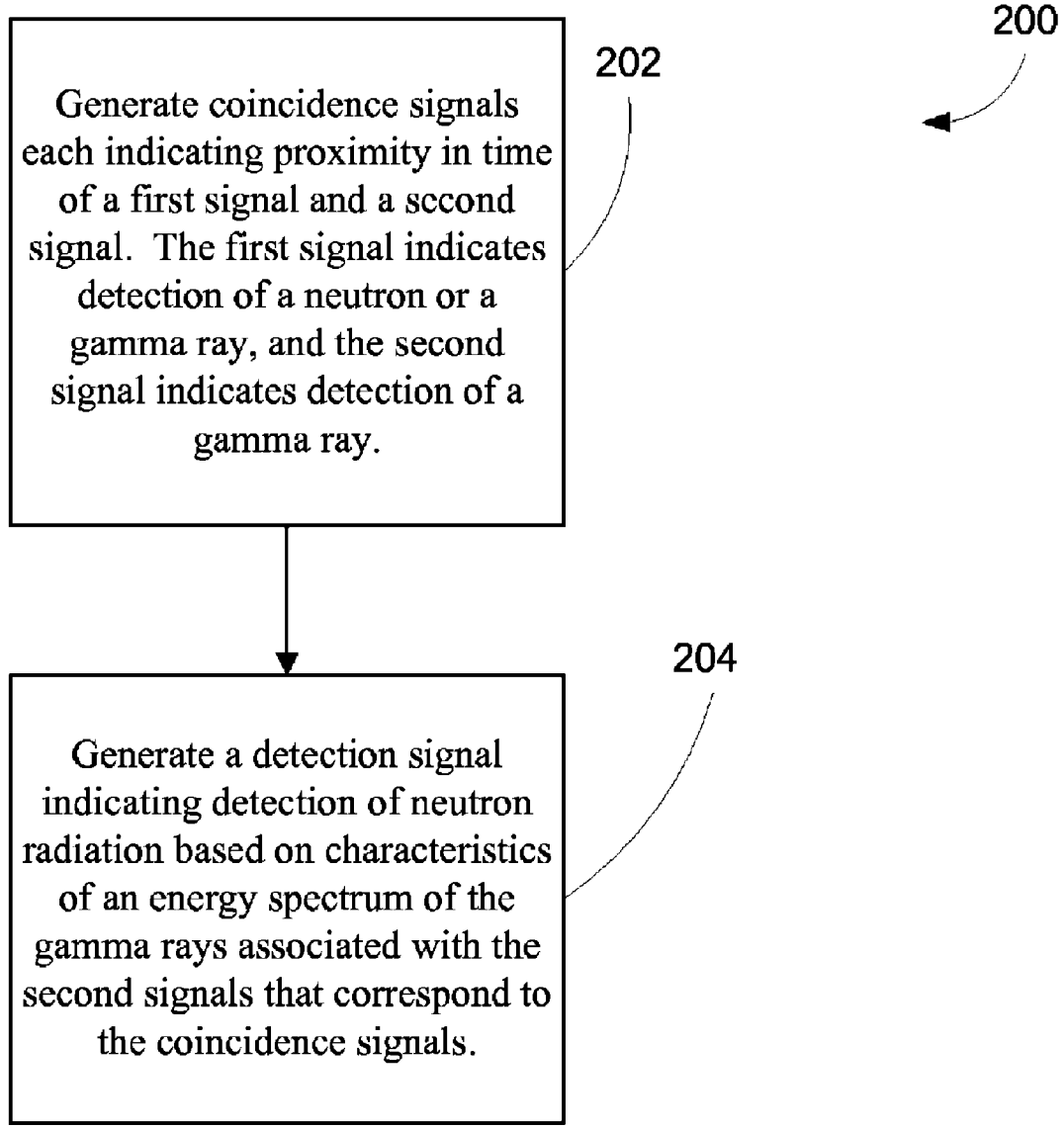
FIG. 6 is a flow diagram of an example process for detecting neutrons.

FIG. 6 is a flow diagram of an example process 200 for detecting neutrons. The process 200 includes generating 202 coincidence signals each indicating proximity in time of a first signal and a second signal. The first signal indicates detection of a neutron or a gamma ray, and the second signal indicates detection of a gamma ray. For example, the first signal may be generated using a microchannel plate detector (e.g., 102 of FIG. 1) or interconnected fibers having electron-emissive surfaces. The second signal may be generated using a gamma ray detector (e.g., 104). Each coincidence signal may indicate that a second signal occurs within a specified time period after occurrence of the first signal. Generating the first signal may include capturing neutrons using one or more nuclide species and generating gamma rays upon the capture of neutrons. The nuclide species may include one or more of boron-10 atoms, gadolinium-155 atoms, and/or gadolinium-157 atoms.

A detection signal indicating detection of neutron radiation is generated 204 based on characteristics of an energy spectrum of the gamma rays associated with the second signals that correspond to the coincidence signals. For example, the detection signal may be generated upon detecting a feature in the energy spectrum of the gamma rays associated with the second signals, in which the feature occurs within a characteristic energy range. The feature in the energy spectrum may include a peak (e.g., 170 or 172 in FIG. 3). The characteristic energy range may be in a range from 470 keV to 490 keV, 190 keV to 210 keV, or 170 keV to 190 keV.

It is to be understood that the foregoing description is intended to illustrate and not to limit the scope of the detector described herein. Other embodiments are within the scope of the claims. For example, in FIG. 1, the anode 108 is optional and the MCP output signal can be obtained from the bottom MCP electrode. The photomultiplier tube 112 can be replaced by an avalanche photodiode. The anode 108 can be a pixilated image sensor that can form images based on the detected neutrons. In this case, the neutron detector 100 can be used for neutron imaging. The gamma ray scintillator can be configured to substantially surround the microchannel plate detector 102 (e.g., cover 4π steradians solid angle relative to the microchannel plate detector 102) to capture as many gamma rays resulting from the neutron capture reactions as possible. The timing coincidence window can have values different from what is described above, e.g., about 10 to 50 ns. A neutron shield can be positioned between the microchannel plate detector 102 and the gamma ray detector 104 to shield the detector 104 from neutrons. The signal processor 162 can be either a general purpose computer such as a personal computer or a dedicated logic circuit.

What is claimed is:

1. A method comprising
generating coincidence signals each indicating proximity in time of a first signal and a second signal, the first signal indicating detection of at least one of a neutron or a gamma ray, the second signal indicating detection of a gamma ray;
after the coincidence signals are generated, analyzing an energy spectrum of the gamma rays associated with the second signals that correspond to the coincidence signals; and
generating a detection signal indicating detection of neutron radiation when characteristics of the energy spectrum of the gamma rays associated with the second signals that correspond to the coincidence signals match characteristics of an energy spectrum of gamma rays associated with a neutron event.

2. The method of claim 1 in which generating a detection signal comprises generating a detection signal indicating detection of neutron radiation upon detecting a feature in the energy spectrum of the gamma rays associated with the second signals, the feature occurring within a characteristic energy range.

3. The method of claim 2 in which the feature in the energy spectrum comprises a peak.

4. The method of claim 2 in which the characteristic energy range corresponds to a range from 470 keV to 490 keV.

5. The method of claim 2 in which the characteristic energy range corresponds to a range from 190 keV to 210 keV.

6. The method of claim 2 in which the characteristic energy range corresponds to a range from 170 keV to 190 keV.

7. The method of claim 1 in which each coincidence signal indicates that a second signal occurs within a specified time period after occurrence of the first signal.

8. The method of claim 1 in which generating a detection signal comprises generating a detection signal indicating detection of neutron radiation upon detecting a first feature and a second feature in the energy spectrum of the gamma rays that correspond to the coincidence signals, the first feature occurring within a first characteristic energy range and the second feature occurring within a second characteristic energy range.

9. The method of claim 8 in which each of the first and second features in the energy spectrum comprises a peak.

10. The method of claim 8 in which the first characteristic energy range corresponds to a range from 470 keV to 490 keV and the second characteristic energy range corresponds to a range from 170 keV to 210 keV.

11. The method of claim 1, further comprising generating the first signal using a microchannel plate detector.

12. The method of claim 11 in which the microchannel plate detector comprises material doped or coated with a nuclide species that emit gamma rays upon capture of neutrons, and the material comprises at least one of a hydrogenous material or a ceramic.

13. The method of claim 1 in which generating the first signal comprises capturing neutrons using multiple nuclide species and generating gamma rays upon the capture of neutrons.

14. The method of claim 13 in which the multiple nuclide species comprise boron-10 atoms and at least one of gadolinium-155 atoms or gadolinium-157 atoms.

15. The method of claim 1, comprising generating a gamma ray energy spectrum using the second signals that correspond to coincidence signals.

16. A method comprising:
generating first signals using a microchannel plate detector, each of the first signals indicating detection of at least one of a neutron or a gamma ray;
generating second signals using a gamma ray detector, each of the second signals indicating detection of a gamma ray;
generating coincidence signals each corresponding to a determination that one of the second signals occurs within a predetermined time period of occurrence of one of the first signals;
after generating the coincidence signals, analyzing an energy spectrum of the gamma rays associated with the second signals that correspond to the coincidence signals; and
generating a detection signal indicating detection of neutron radiation if the second signals that correspond to the coincidence signals indicate a first peak in the energy spectrum of the gamma rays associated with the second signals, the first peak occurring within a first characteristic energy range.

17. The method of claim 16 in which generating the first signals comprises using a microchannel plate detector that is doped or coated with multiple nuclide species that emit gamma rays when capturing neutrons.

18. The method of claim 17, wherein the nuclide species comprise boron-10 and at least one of gadolinium-155 or gadolinium-157.

19. The method of claim 16 in which the first characteristic range corresponds to at least one of a range from 470 keV to 490 keV, a range from 190 keV to 210 keV, or a range from 170 keV to 190 keV.

20. The method of claim 16 in which generating a detection signal comprises generating a detection signal if the second signals corresponding to the coincidence signals indicate a first peak and a second peak in an energy spectrum of the gamma rays associated with the second signals, the first peak occurring within a first characteristic energy range and the second peak occurring within a second characteristic energy range.

21. The method of claim 20 in which the first characteristic energy range corresponds to a range from 470 keV to 490 keV and the second characteristic energy range corresponds to a range from 170 keV to 210 keV.

22. The method of claim 16 in which each of the coincidence signals indicates that the corresponding second signal occurs within 50 nanoseconds after occurrence of the corresponding first signal.

23. The method of claim 16 in which each of the coincidence signals indicates that the corresponding second signal occurs within 10 nanoseconds after occurrence of the corresponding first signal.

24. The method of claim 16 in which the microchannel plate detector comprises material doped or coated with a nuclide species that emit gamma rays upon capture of neutrons, and the material comprises at least one of a hydrogenous material or a ceramic.

25. A method comprising
generating first signals using a microchannel plate detector, each of the first signals indicating detection of at least one of a neutron or a gamma ray, the microchannel plate detector comprising material doped or coated with multiple nuclide species that include at least two nuclide species that emit gamma rays having different energy levels upon capture of neutrons;
generating second signals using a gamma ray detector, each of the second signals indicating detection of a gamma ray;
generating coincidence signals each indicating proximity in time of one of the first signals and one of the second signals; and
after generating the coincidence signals, generating an energy spectrum of the gamma rays associated with the second signals that correspond to the coincidence signals.

26. The method of claim 25 in which the material comprises at least one of glass, silicon, hydrogenous materials, or ceramics.

27. The method of claim 25, comprising detecting two peaks in the energy spectrum, the first peak being within a first predetermined characteristic energy range, the second peak being within a second predetermined characteristic energy range.

28. The method of claim 27, comprising generating a detection signal indicating detection of a stream of neutrons upon detection of the two peaks.

29. The method of claim 27 in which the first characteristic energy range corresponds to a range from 470 keV to 490 keV and the second characteristic energy range corresponds to a range from 170 keV to 210 keV.

30. The method of claim 25 in which the material comprises at least one of hydrogenous materials or ceramics.

31. An apparatus comprising:
a coincidence detector to detect coincidence events in which each coincidence event indicates proximity in time of a first signal and a second signal, the first signal indicating detection of at least one of a neutron or a gamma ray, the second signal indicating detection of a gamma ray by a gamma ray detector; and
a data processor to, after detecting the coincidence events, analyze an energy spectrum of the gamma rays associated with the second signals that correspond to the coincidence events, and identify detection of neutron radiation when characteristics of the energy spectrum of the gamma rays associated with the second signals that correspond to the coincidence signals match characteristics of an energy spectrum of gamma rays associated with a neutron event.

32. The apparatus of claim 31 in which the coincidence detector comprises a time-to-digital converter to analyze timing of the first and second detection signals.

33. The apparatus of claim 31 in which the data processor identifies detection of neutron radiation by detecting a first peak in the energy spectrum of the gamma rays associated with the second signals that correspond to the coincidence events, the first peak occurring within a first characteristic energy range.

34. The apparatus of claim 31, further comprising a microchannel plate detector that generates the first signal upon detection of at least one of a neutron or a gamma ray.

35. The apparatus of claim 34, wherein the microchannel plate detector comprises a material doped or coated with multiple nuclide species that, upon capture of a neutron, emit a gamma ray directly or generate a second particle in an excited state that subsequently decays to a lower energy state and emits a gamma ray.

36. The apparatus of claim 35, wherein the multiple nuclide species comprise boron-10 and at least one of gadolinium-155 or gadolinium-157.

37. The apparatus of claim 35 in which the material comprises at least one of glass, silicon, hydrogenous materials, or ceramics.

38. The apparatus of claim 35 in which the material comprises at least one of a hydrogenous material or a ceramic.

39. An apparatus comprising:
a microchannel plate detector to generate a first detection signal upon detection of at least one of a neutron or a gamma ray;
a gamma ray detector to generate a second detection signal upon detection of a gamma ray; and
a data processor to detect coincidence events each indicating proximity in time of the first detection signal and the second detection signal, and after the coincidence events are detected, analyze an energy spectrum of the gamma rays associated with the second signals that correspond to the coincidence events, and to detect neutron radiation when characteristics of energy spectrum of the gamma rays associated with the second signals corresponding to the coincidence events match characteristics of an energy spectrum of gamma rays associated with a neutron event.

40. The apparatus of claim 39 in which the microchannel plate detector comprises a material doped or coated with multiple nuclide species that, upon capture of a neutron, emit a gamma ray directly or generate a second particle in an excited state that subsequently decays to a lower energy state and emits a gamma ray.

41. The apparatus of claim 40 in which the multiple nuclide species comprise boron-10 and at least one of gadolinium-155 or gadolinium-157.

42. The apparatus of claim 40 in which the material comprises at least one of glass, silicon, hydrogenous materials, or ceramics.

43. The apparatus of claim 40 in which the material comprises at least one of a hydrogenous materials or a ceramic.

44. The apparatus of claim 39, further comprising a time-to-digital converter to analyze timing of the first and second detection signals.

\* \* \* \* \*

UNITED STATES PATENT AND TRADEMARK OFFICE
CERTIFICATE OF CORRECTION

PATENT NO.       : 8,766,206 B2  
APPLICATION NO.  : 12/832615  
DATED            : July 1, 2014  
INVENTOR(S)      : W. Bruce Feller and Paul L. White Page 1 of 1

It is certified that error appears in the above-identified patent and that said Letters Patent is hereby corrected as shown below:

In the Claims

Col. 12, line 31, Claim 14, delete "boron-10atoms" and insert -- boron-10 atoms --, therefor.

Col. 14, line 30, Claim 36, delete "boron-10and" and insert -- boron-10 and --, therefor.

Col. 14, line 61, Claim 41, delete "boron-10and" and insert -- boron-10 and --, therefor.

Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,766,206 B2
APPLICATION NO. : 12/832615
DATED : July 1, 2014
INVENTOR(S) : W. Bruce Feller and Paul L. White Page 1 of 1

It is certified that error appears in the above-identified patent and that said Letters Patent is hereby corrected as shown below:

In the specification

Col. 1, after line 3, please include the following paragraph:

-- STATEMENT REGARDING FEDERALLY SPONSORED RESEARCH OR DEVELOPMENT

This invention was made with government support under Domestic Nuclear Detection Office contract HSHQDC-08-C-00190. The government has certain rights in the invention. --

Signed and Sealed this
Fifth Day of April, 2016

Michelle K. Lee
*Director of the United States Patent and Trademark Office*